United States Patent
Westby et al.

(10) Patent No.: US 9,318,113 B2
(45) Date of Patent: Apr. 19, 2016

(54) METHOD AND APPARATUS FOR CONDUCTING SYNTHESIZED, SEMI-SCRIPTED, IMPROVISATIONAL CONVERSATIONS

(71) Applicants: Michael C. Westby, Happy Valley, OR (US); Eric A. Weymueller, Friendswood, TX (US)

(72) Inventors: Michael C. Westby, Happy Valley, OR (US); Eric A. Weymueller, Friendswood, TX (US)

(73) Assignee: Timestream LLC, Happy Valley, OR (US)

( * ) Notice: Subject to any disclaimer, the term of this patent is extended or adjusted under 35 U.S.C. 154(b) by 407 days.

(21) Appl. No.: 13/932,334

(22) Filed: Jul. 1, 2013

(65) Prior Publication Data
US 2015/0006171 A1    Jan. 1, 2015

(51) Int. Cl.
*G10L 15/18* (2013.01)
*G10L 15/22* (2006.01)
*G10L 15/26* (2006.01)
*G06F 17/30* (2006.01)

(52) U.S. Cl.
CPC .......... *G10L 15/26* (2013.01); *G06F 17/30654* (2013.01)

(58) Field of Classification Search
CPC ......... G10L 15/18; G10L 15/22; G10L 13/00; G06F 17/21; G06F 17/2229; G06F 17/30017; G06F 17/30796
USPC ......... 704/233, 257, 270, 275, 278, 258, 260, 704/272; 707/736, 758
See application file for complete search history.

(56) References Cited

U.S. PATENT DOCUMENTS

| | | | |
|---|---|---|---|
| 4,305,131 A * | 12/1981 | Best | A63F 13/00 273/460 |
| 5,730,603 A | 3/1998 | Harless | |
| 5,870,755 A * | 2/1999 | Stevens | G06F 17/30796 706/59 |
| 6,246,981 B1 | 6/2001 | Papineni et al. | |
| 6,480,826 B2 | 11/2002 | Pertrushin | |
| 6,731,307 B1 | 5/2004 | Strubbe et al. | |
| 6,944,586 B1 * | 9/2005 | Harless | G06Q 90/00 704/275 |
| 6,990,451 B2 * | 1/2006 | Case | G10L 13/06 704/260 |
| 7,499,861 B2 | 3/2009 | Danieli | |
| 7,797,146 B2 | 9/2010 | Harless | |
| 8,751,231 B1 * | 6/2014 | Larsen | G06Q 10/1053 704/243 |
| 8,874,444 B2 * | 10/2014 | Irmler | A63H 30/00 704/258 |
| 2001/0053976 A1 * | 12/2001 | Olko | G10L 15/22 704/270 |

(Continued)

*Primary Examiner* — Martin Lerner
(74) *Attorney, Agent, or Firm* — Mersenne Law

(57) ABSTRACT

Simulating an improvisational conversation between two or more people (or between a person and himself at a later time) by recording an original conversation involving some of the people and annotating the recording to produce an interview source database, then receiving a statement from another of the people, matching the statement against the interview source database to obtain a suitable audio response in the voice of a participant in the original conversation, and playing the audio response for the speaker or sender of the statement.

3 Claims, 4 Drawing Sheets

(56) References Cited

U.S. PATENT DOCUMENTS

| | | | |
|---|---|---|---|
| 2002/0010584 A1 | 1/2002 | Schultz et al. | |
| 2003/0046181 A1* | 3/2003 | Dow | G06Q 10/10 705/26.1 |
| 2003/0151678 A1* | 8/2003 | Lee | H04R 1/406 348/231.4 |
| 2004/0027466 A1* | 2/2004 | Mizobuchi | H04N 1/215 348/231.4 |
| 2005/0099530 A1* | 5/2005 | Mizobuchi | H04N 5/23241 348/370 |
| 2008/0124690 A1 | 5/2008 | Redlich | |
| 2008/0288256 A1* | 11/2008 | Agapi | G10L 13/04 704/260 |
| 2009/0144060 A1* | 6/2009 | Groeger | G10L 13/00 704/260 |
| 2009/0187514 A1 | 7/2009 | Hannan et al. | |
| 2009/0210808 A1 | 8/2009 | West | |
| 2011/0239107 A1* | 9/2011 | Phillips | G06F 17/24 704/278 |
| 2013/0226588 A1 | 8/2013 | Irmler et al. | |
| 2013/0287217 A1* | 10/2013 | Lee | G10K 11/178 381/71.1 |
| 2013/0311528 A1 | 11/2013 | Liebermann | |
| 2014/0028780 A1 | 1/2014 | Croen et al. | |
| 2014/0036022 A1 | 2/2014 | Croen et al. | |
| 2014/0036023 A1 | 2/2014 | Croen et al. | |
| 2014/0074471 A1* | 3/2014 | Sankar | G10L 17/02 704/246 |

\* cited by examiner

METHOD AND APPARATUS FOR CONDUCTING SYNTHESIZED, SEMI-SCRIPTED, IMPROVISATIONAL CONVERSATIONS

CONTINUITY AND CLAIM OF PRIORITY

This is an original U.S. patent application.

FIELD

The invention relates to speech signal processing and linguistics. More specifically, the invention relates to systems having multiple natural-language input paths; word, linguistic and semantic analysis operations on signals which represent speech; and speech synthesis systems to simulate speech of particular speakers.

BACKGROUND

Pioneering computer science researcher Alan Turing proposed, in 1950, a thought experiment or game for answering the question, "can machines think?" The game became known as the "Turing Test," and is commonly stated as follows: given a human interrogator and two respondents (one human and one machine), can the interrogator tell the respondents apart by means of a conversation or series of interactions? If not (i.e., if the interrogator cannot tell which respondent is human, or if the machine can fool the interrogator into believing that it is the human) then perhaps the machine is doing something like thinking.

At the time Turing wrote, machines were very far away from making a credible showing in such a test, but over the following decades, advances on a number of fronts have made the Loebner Prize, an annual Turing Test competition, into an entertaining and surprising showcase of state-of-the-art combinations of various foundational technologies. No program has yet won the gold medal by fooling half the judges in open-ended competition (while dealing with music, speech, pictures and video, as well as Turing's original typewritten text), but special-purpose programs have performed well in complex tasks such as the quiz, puzzle and language-processing game Jeopardy!®

The computational pieces that may eventually make up a Turing Test winner are even now good enough for many practical applications. For example, speech recognition is widely used in Interactive Voice Response ("IVR") systems to process spoken commands and provide first-line customer telephone support; natural language processing ("NLP") ingests human speech (ported to text) and attempts to find (or generate) a correct response; and speech synthesis can read text aloud to help the visually impaired.

Advances in these technologies, and new and creative combinations of them, are likely to continue to provide cost savings, improved services and valuable new experiences.

SUMMARY

Embodiments of the invention record information (including audio signals) during an interview or conversation with a subject, then augment the information with natural-language processing ("NLP") tags and other metadata identifying and describing relevant features of the conversation. Subsequently, a user interacts with the system (orally or in writing) so as to engage in a conversation, and the system interprets the user's questions and statements and finds relevant portions of the augmented, recorded information. The relevant portions are returned, played or performed for the user to produce a simulated, synthesized conversation between the user and the subject. Different users may experience different simulated conversations synthesized from the same interview record data. In fact, a single user may even experience different simulated conversations on different occasions.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

The system described herein simulates space-, time- and participant-shifting of conversations. That is, a system user can participate in an unscripted conversation with another person, even though the second person is not present and may never have met the system user. Embodiments may be used in a variety of scenarios. For example, in an educational context, students can "interview" historical figures, some of whom may have passed away after making their initial recording (e.g., World War II veterans) to learn about past events. In foreign language study, students can practice conversations in the new language. As entertainment, the system can allow the parent of an adult child to reminisce by talking with a young version of the child (or the grown child could speak with a young version of himself). A celebrity's fans may enjoy personalized conversations with the celebrity. The system for producing a "conversational database" may be accessible to anyone, so ordinary people—citizens of particular country, adherents to a religion or members of a cultural group—can interact virtually with other people around the world, discussing in their own words the topics that others are curious about. Other contemplated applications will be discussed below.

Figure 1:
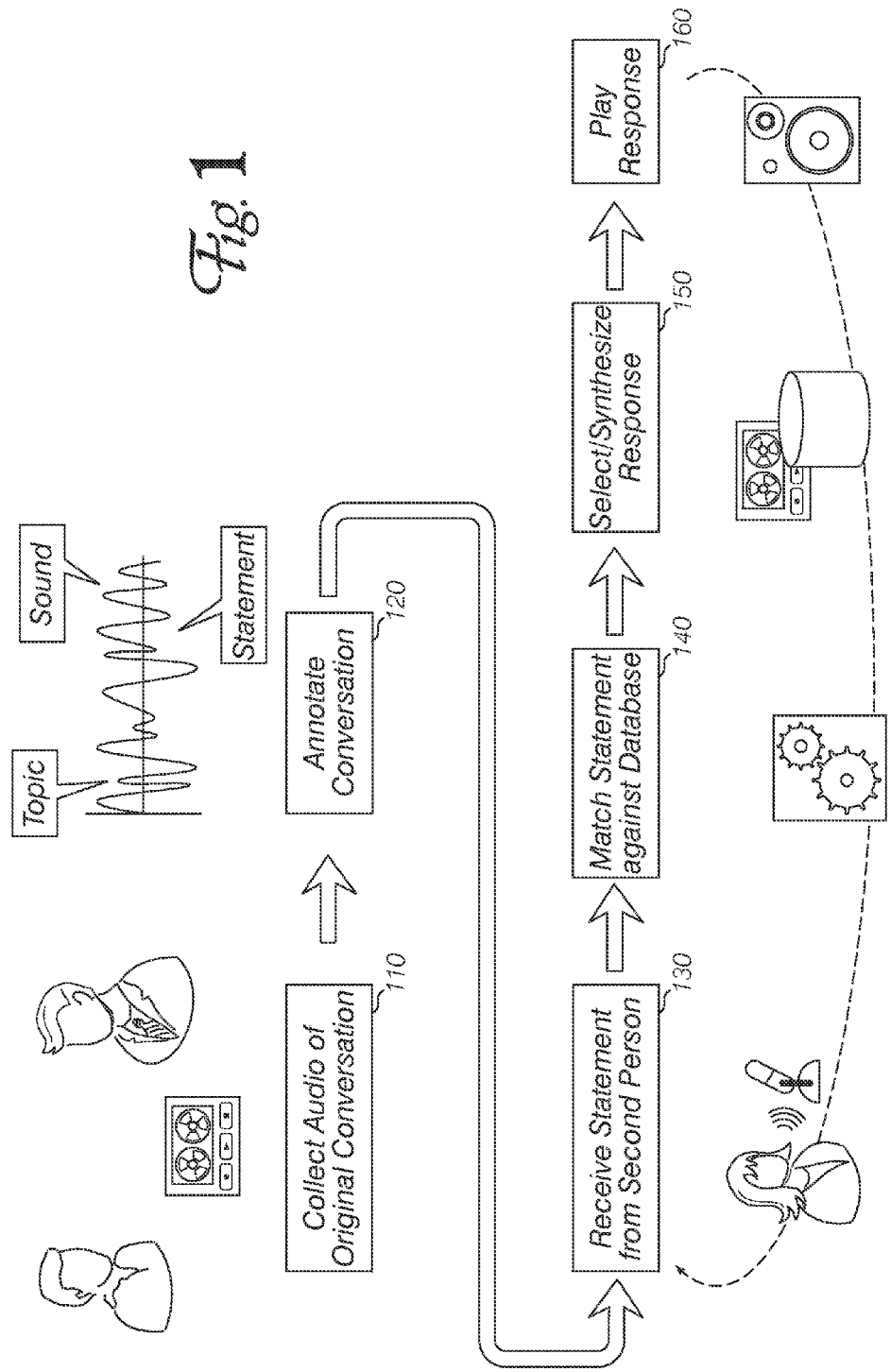
FIG. 1 shows an overview of the operational flow of an embodiment.

FIG. 1 is a system-level overview of an embodiment of the invention. To begin, an audio record of an original conversation is collected (110). The original conversation includes at least the subject speaking, but may also include one or more live interviewers, or an interviewer who also accepts questions sent by audience members viewing the original conversation.

An interview or conversation with multiple subjects may also be recorded (for example, the members of a music group may be interviewed together, and a recording made of the conversation). There may be no formal interviewer or written questionnaire; the original conversation may simply be the subjects speaking to one another about a particular event or topic, or about a wide range of topics. Some embodiments may also collect still images, video or 3D/holographic information while recording the original conversation.

Next, the audio record of the conversation is annotated (120). Annotation will be discussed in greater detail below, but the general purposes of annotation are to mark places in the audio record where sentences, words and/or sounds appear; to create a textual transcript of the conversation; and to add searchable information ("Natural Language Processing [NLP] tags") about the topics being discussed. For example, an annotation might mark a point in the conversation where the subject says someone else's name, and the tags might include information about the mentioned person's relationship to the subject.

Note that the original conversation need not be free-form (i.e., it can be partly or entirely scripted) and the subject may be impersonated by an actor—for example, to prepare an "original" conversation with a deceased person of historical interest, such as George Washington or Marie Curie.

Collecting and annotating a conversation with one or more subjects creates an interview source database that is used in subsequent operations of the system. Those subsequent operations simulate a conversation between the system user and the subject(s) of the original conversation.

A statement is received from the user (130), for example through a voice and speech recognition process. The statement (converted to text) is matched against the NLP tags and other information in the interview source database (140). The database may catch the statement (giving one or more possible responses), or a default or conversational-redirect response may be chosen instead (150). Finally, the audio corresponding to the selected or synthesized response is played for the user (160).

As a concrete example of the conversational simulation, if the user says "Hi, who is this?" the system may locate a portion of the interview source database where the speaker identifies himself and play that back. The response selection and/or synthesis (150) may also choose a segue portion of the source database to play, to attempt to direct the conversation to an area where a rich choice of topics, responses and sounds is available.

The receiving, matching, synthesis and playback steps (130-160) can be repeated to simulate a back-and-forth conversation between the user and the subject(s) of the original conversation. Since the system's responses are constructed from the original audio recordings, the system's side of the conversation sounds like the subject rather than a generic computer-generated voice.

In the remainder of this Specification, we examine the overview operations in greater detail, to point out specific implementation considerations that may improve overall system operation or extend system capabilities.

A very simple and primitive embodiment may begin with a pre-recorded interview, conversation, or discussion involving the subject(s). However, for superior conversation-synthesizing performance, it is preferred that the original conversation include as many of the following items as possible:

Full-phoneme test sentences
Several test sentences containing words that show off the subject's pronunciation of a range of phonemes, including how the subject transitions from an ending phoneme of one word to a beginning of another word. For example, sentences like this may be used:
I have a sieve full of sifted thistles and a sieve full of unsifted thistles, because I am a thistle sifter.
Four furious friends fought for the phone.
Larry sent the latter a letter later.
The purpose of these recorded elements is to enable the creation of a custom voice font for the original subject.
Several clear subject identifications
Self-identification statements in the subject's own voice, such as:
Hello, this is Alexander Graham Bell.
Hi, my name is Martin Finnegan.
Hi, we are the 1990 Chicago Bulls.
You're speaking with President Bill Clinton.
as well as plain recitations of the subject's name, as if in answer to the questions, "who is this?" or "what's your name?"

Confusion/Misunderstanding Statements
Conversational redirect statements that can be used during synthesis to indicate that the system was unable to interpret the user's statement:
I'm sorry, what was that?
Huh?
Wait, what?
Can you say that again?
That's an interesting thought. How about if we discuss . . . ?
That's a good question, but you may want to ask someone else.
Would you mind repeating that?

Time-Referential Statements
Sentences and phrases referring to times during the conversation:
Like I said before, . . . .
Didn't I just tell you?
When you said that, . . . .

Reflexive Interview Questions
Questions from the subject to the interviewer, that could reasonably be posed to any person with whom the subject was speaking:
What's your name?
How's the weather?
Did you see [recent event]?

Repetition
In scripted or partially-scripted interviews, the interviewer may repeat earlier-answered questions to obtain additional examples of the subject's answers thereto. These subsequent answers may elicit further or different details that can reduce apparent repetitiveness in a later synthetic conversation or enhance the later user's impression that the synthetic conversation is with a live person.

Foley Sounds
Environmental sounds appropriate to the conversation subject. For example, in an interview with a musician, sample guitar or keyboard riffs.
Other examples include:
Responder takes a sip of water from a glass and puts it down
Phone rings in background
Chair moves
Sound of a trotting horse (e.g., in the background of a "conversation" with President Abraham Lincoln)
Sound of rain on window
Coughs, laughs, etc.
Note that some Foley sounds can be generic (i.e., able to be overlaid onto many different synthesized conversations).

Openings
Statements suitable for reproduction near the beginning of a synthesized conversation:
It's good to be here.
I'm glad to be able to speak with you.
Hello! I've been looking forward to speaking with you!

Closings
Statements suitable for reproduction near the end of a synthesized conversation:
I've enjoyed speaking with you. Goodbye.
It's been nice to chat with you.

I'm sorry, but I have to go. Can we speak again later?
Goodbye.
Common Phrases
An assortment of filler phrases and personal colloquialisms of the sort chosen by the subject himself:
I'm fine.
Good, and you?
I'm doing great!
You don't see that every day.
Are you kidding?
Common Words
Conjunctions, clays, weeks, months, numbers and other words suitable for constructing simple sentences and declarative statements:
and, the, but, yes, no, Monday-Sunday, January-December, yesterday, today, tomorrow, etc.
Interruptions
Non-sequiturs and interferences with the original conversation, that can be used to impart a spontaneous feel to the later synthesized conversation:
Hold on, I need to turn the volume up.
Can you excuse me a sec? Somebody's trying to ask me something.
OK, now where were we?

An interactive computer application can be used during the original conversation to provide a checklist of these statements, sounds and other desirable items. This application may do double duty by reminding the subject(s) and interviewer(s) of things to say, and providing initial time coding to help during later annotation of the recordings.

When recording an interviewer and subject, or more than one subject, it is preferable to obtain separate audio channels or tracks for each individual. Any convenient medium or encoding format may be used, although digital recordings are preferred for simplicity of further processing. Analog recordings should be digitized before moving to the next phase. Conventional or newly-developed encoding and compression schemes that permit rapid access to arbitrary portions of the recording are suitable. In some embodiments, the complete recording(s) may be divided into separate files (or similar units), stored in a database or otherwise arranged for convenient piecewise access.

It is appreciated that, at least in basic implementations, the synthesized conversation cannot be significantly longer or more detailed than the original conversation, because there is not enough source material from which to construct a new, different conversation (at least, not without repetition). Thus, the more original material available to the system, the more likely it is to be able to synthesize varied, natural and engaging conversations. However, the "more is better" position must be balanced against an increased chance for "cross-talk" among the NLP tags in the database. (E.g., if the subjects have talked about bridges [on roadways], bridge [the card game], and Bridges of Madison County [the movie], then a user's question about "bridges" might be caught by the "wrong" portion of the interview source database.) Approaches for reducing the adverse effects of cross-talk are discussed below.

An embodiment may combine a number of separate original conversations with the subject(s) into the interview source database. And even after the database has been created, an embodiment may collect, annotate and store additional material from the subject(s). For example, actual synthetic conversations may be reviewed, and for topics that occur often, but for which the database lacks depth of coverage, the subject may be interviewed about those topics and the resulting conversations used to supplement the interview source database.

For an interview with several people (e.g., a sports team, musical group, or movie cast), both group and individual interviews may be collected, annotated and aggregated into the interview source database. Then, in a later synthesized conversation, the user may direct questions or statements to a specific one of the original subjects and receive a response from that person. If no such response is caught during matching, then the next-best response (of any of the subjects) may be located and played instead.

Figure 2:
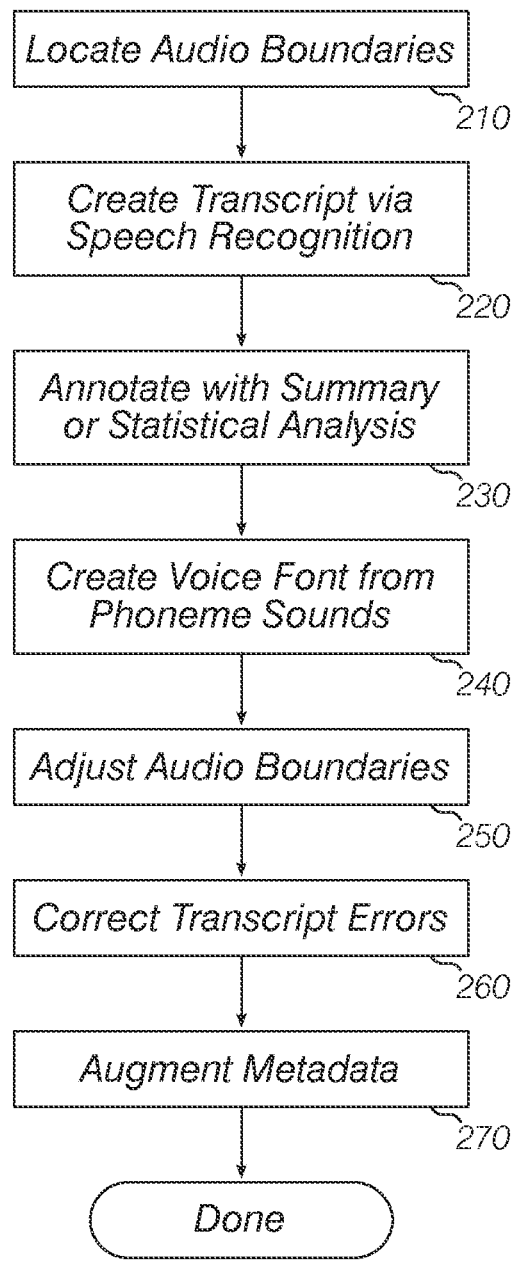
FIG. 2 outlines a process for creating an interview source database from a recording of an original conversation.

Once original audio recordings of a conversation with a subject are available, they can be annotated by following the process outlined in FIG. 2. First, mechanical analyses are automatically applied to each of the recorded tracks. For example, sound volume can be examined to find the beginnings and ends of words and groups of words/phrases (210). Further processes can work with time codes indicating where useful portions of the recording may be found, but in a preferred embodiment, the recording(s) is/are divided into separate voice file units, each such unit containing a short segment of audio for replay. The voice file units may be stored as data files in a standard computer filesystem, or as entries in a database. Audio processing may be used to "clean up" the beginnings and ends of the voice file units to reduce unwanted audio artifacts (e.g., clicks and pops) that might occur when a unit is replayed.

An automatic speech recognition process can produce an initial transcript of the marked phrases (220). Automatic or statistical summarization can make a first set of annotations, associating particular portions of the audio with certain topics or concepts (230). If phoneme sample sentences were recorded, individual phoneme sounds may be extracted and used to create a voice font (240). Software and services to create voice fonts are commercially available from companies such as Cereproc of Scotland, AT&T (the Natural Voices product), and iSpeech Inc. In some embodiments, the voice font may be used to synthesize new utterances that sound like the subject speaking, although the exact words of the synthesized statement do not appear in the original conversation recording.

For some applications, this automatic processing alone is adequate to produce a useable interview source database. However, a more accurate and complete database may be constructed by manually adjusting word and phrase markings (250), correcting transcription errors (260), or adding additional annotations (NLP tags and/or metadata) (270). The additional annotations may include additional facts about the speaker(s) or the topics discussed in the original conversation, or information that a human would know or understand, that an automatic system would not otherwise have access to.

One annotation that may be useful is to associate pronouns with their intended referent (as well as with other possible referents). For example, if the phrase "we couldn't believe he ate that!" was in the original interview, then "we" could be marked with the identities of the people present, "he" could be marked with the identity of the person referred to, and "that" could be marked with the name of the unbelievable thing that "he" ate.

Additional database editing and annotation may also take into account the synthesis system's performance during testing or actual end-user conversations. For example, in an educational system designed to allow students to interview a famous historical person, it may be discovered that many students ask questions about an aspect of the person's life or work that are unanswered in the database. In such a case, additional original-conversation material may be recorded and added to the database. Testing may also show, for example, that conversation synthesis would be more convincing if the computer-emulated subject takes a more active role in directing the interaction. (This is often called "motivated" conversation.) To support this model, additional transitional and inquisitive source conversations may be recorded and added to the database, and the system can select and play them to lead the user to discuss topics that have better database coverage.

It should be noted that the recording and annotation of the original conversation should include the interviewer's statements, as well as the subject's. Although audio of the interviewer is unlikely to be replayed during subsequent synthesized conversations, the annotation, transcript, NLP tags and metadata of his statements are likely to be useful in constructing NLP tags for the subject's response, and for selecting portions of the subject's statements to play. For example, an interviewer's question could itself serve as an NLP tag for the subject's next response. If the end user asks the same question, then that tag would catch the question and the subject's response could be replayed. Leveraging the interviewer's statements in this way improves the NLP tagging that can be done automatically and reduces the amount of hand-tweaking that may be required to fine-tune the tags for better conversation-synthesis performance.

Figure 3:
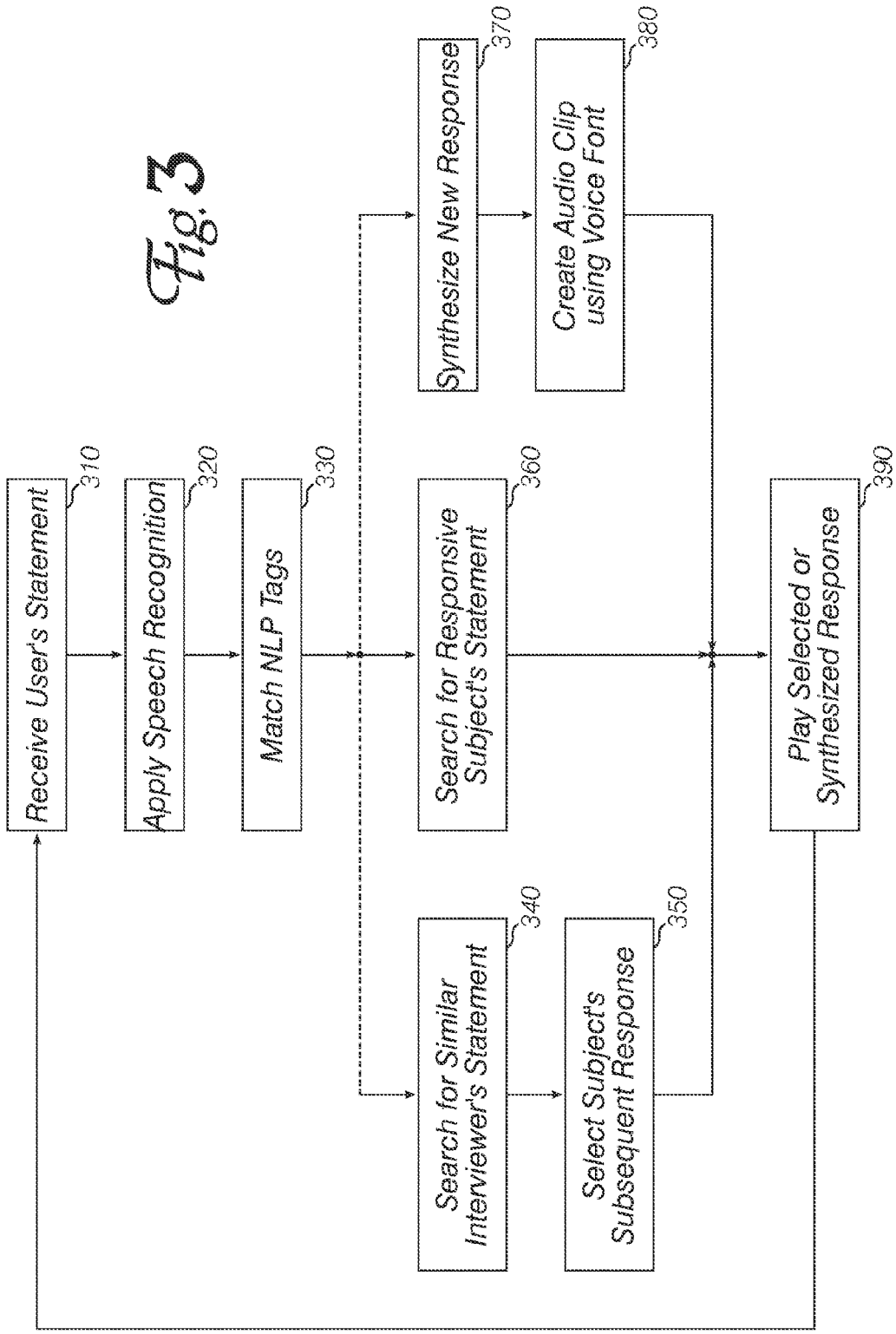
FIG. 3 shows a process for conducting a synthesized conversation according to an embodiment of the invention.

FIG. 3 outlines a "playback" portion of the process, where a system user interacts with a computer or other device, including without limitation a mobile phone, television or laptop computer, that stands in for the original-conversation subject in an unscripted, synthesized conversation. In one embodiment, the user calls a telephone number that is answered by the conversation-synthesizing engine; the telephone number selects an available interview source database, so the user experience is like calling the subject of the original conversation and speaking with him or her. In this embodiment, the system may begin the interaction by playing a clip of the subject answering the phone: "Hi, this is [subject's name here]."

First, a statement (e.g., a question) is received from the user (310). For example, the user may speak into a microphone connected to a computer system, and his voice may be digitized for further processing. Speech recognition is applied (320) to convert the user's utterance into a textual representation. (In some embodiments, users may type their side of the conversation on a keyboard, but hear the replies aurally.) Since most implementations include a text phase (i.e., both original interview and the user's statements are converted to text at some point) an embodiment may include an option to display that text, in the manner of Closed Captioning. Next, the textual representation of the user's statement is matched to NLP tags in the interview source database (330), to locate (or "catch") subject statements that might be appropriate responses.

The system's next task is to find (or create) an audio snippet containing a suitable response to the user's statement, wherein the snippet sounds like the response was uttered by (one of) the subject(s). Possible options for accomplishing this task include searching the interview source database for an interviewer's statement that is similar to the user's (340), and selecting the audio of the subject's response to the interviewer (350); catching a subject statement that is responsive (360); or synthesizing a new sentence, statement or other response (370) and using a previously-created voice font to render the response in an audio clip that sounds like the subject's voice (380).

Finally, the audio snippet is played for the system user (390). This sequence can be repeated as desired to simulate a conversation between the user and the subject of the original conversation.

During a synthesized conversation, the system keeps track of the user's statements and its responses, so that reflexive pronouns can be resolved correctly and to avoid falling into a conversational loop where previously-played statements are repeated. In some embodiments, the synthesized conversation may be recorded and processed to produce a second interview source database, which can provide information to help the system operator improve the content or synthetic reproduction of the main source database. A system can also track its interactions with individual end users, so that a second (or subsequent) synthesized conversation can refer back to topics "discussed" previously. This historical data (both per-end-user and aggregated among end users) can be analyzed using averaging and predictive algorithms (generally, "machine learning") to improve conversational synthesis from interview source databases.

Other tools and utilities are provided to assist in the creation and dissemination of interview source databases. It is expected that such databases will be created by celebrities, renowned athletes, musicians, politicians and other influential people, as well as by ordinary people; and that the databases may be collected into libraries that offer patrons an opportunity to "converse" with others for educational or entertainment purposes. These synthetic conversations are unlike other man-machine interactions for a number of reasons:

The user knows the respondent, or at least knows of the respondent, and the respondent is a specific person. In other contemporary systems, the respondent is an all-digital construct that—at best—is configured to perform as if it had certain personality traits.

The interview source database includes the recorded voice of the subject, so the synthesized conversation sounds like the subject is speaking. Even in an advanced implementation where new statements are formulated (i.e., statements that the subject never uttered during the original interview) the statement is rendered using pieces of the subject's own words, or a voice font constructed from the subject's own voice.

Synthetic conversations provide an opportunity to speak to a specific person, at a particular point in that person's life (i.e., at the time the original interview was recorded). A user can "converse" with the subject even after the subject has passed away.

Each synthetic conversation may be different—different users may experience different conversations, and one user may experience different conversations on different occasions. The only limitation is the amount of source material in the interview source database.

Synthetic conversations may touch on a wide variety of topics: opinion, memory, advice, motivation, humor, etc. Standard interactive voice response ("IVR") systems are typically narrowly focused on helping the user to perform one task (out of a small number of possible tasks), or to obtain a particular piece of information available to the system (e.g., current balance of a credit card account or hours of operation for a store).

The conversations are "improvisational" or "semi-scripted" in the sense that there may not be a specific goal to be achieved (i.e., the user is not trying to make the system do something, or to find and return a particular answer). Instead, the system attempts to hold up one end of a conversation about a particular topic, with strategic use of personalization/customization, conversational redirects and questions to the end user so that the overall impression is that of an unconstrained, free-form conversation with the original subject(s).

An interview source database may contain material from more than one respondent—for example, it may contain information to synthesize a conversation with members of a sports team, musical group or movie cast and crew. A user may be able to direct questions to a specific individual in the group, and receive answers constructed from that person's statements, presented in the person's own voice.

Reducing Detrimental Crosstalk

As mentioned above, a large interview source database may contain subject material to respond to a wide range of system-user statements, but this can also give rise to confusing synthesized conversation if a user's statements about one topic happen to catch a subject's statement about a different topic. To reduce the incidence of this sort of confusion, an embodiment may subdivide the source database into a plurality of topics, and restrict the matching operation (e.g., FIG. 3, 330) to a current one of the topics. In such an embodiment, transitions between topics may be accompanied (or signaled) by a Foley sound or other conversational interruption. A system heuristic that prevents frequent/rapid topic switching may reduce confusion and improve conversational spontaneity. The different topics are called "knowledge verticals" and can be envisioned as separate repositories of subject statements about each topic. For example, in an interview source database created during a conversation with an actor, discussion of each of the actor's movies may be placed in a separate knowledge vertical. An NLP tag or other metadata indicator marks the knowledge vertical of a statement, and a "current topic" indicator of the conversational synthesis engine serves to eliminate knowledge verticals that are different from the current topic.

When a new synthesized conversation begins, the current topic may be initialized to the null topic. In this state, portions of the user's statements that match a knowledge-vertical name or description cause the current topic indicator to be set to that topic. Subsequent topic changes may be initiated by the synthesis system as mentioned above, or by a user statement that does not catch any statement in the current knowledge vertical, but does catch a statement in a different vertical.

Example NLP Tags

The following table shows how an embodiment of the invention might annotate a portion of an interview with a musician:

a successful match is the identification of a corresponding responsive statement. When such a statement is found, the audio file can be played for the end user.

Improving Conversational Balance

Contemporary Interactive Voice Response ("IVR") systems often produce one-sided interactions: the user issues a command, and the system executes it; or the user asks a question and the system attempts to locate and provide an answer. However, in an embodiment of the invention, improved conversational balance can be achieved by recording, annotating and playing subject statements that ask questions of the system user or direct the user to do something. For example, in a synthesized conversation with a musician (or group) where the knowledge vertical is one of the musician's albums, the system may ask the user (in the musician's voice) which of the songs on the album is the user's favorite. Or, in an educational conversation with a historical personage, the system may ask the user which event he thinks was more important, or why something happened the way it did. These prompts may improve the user's perception of the synthesized conversation as an interactive experience with the subject of the original interview, and can also serve to measure the system user's progress in acquiring and understanding information in an educational context.

User Preferences (Personalized Synthesized Conversations)

Figure 4:
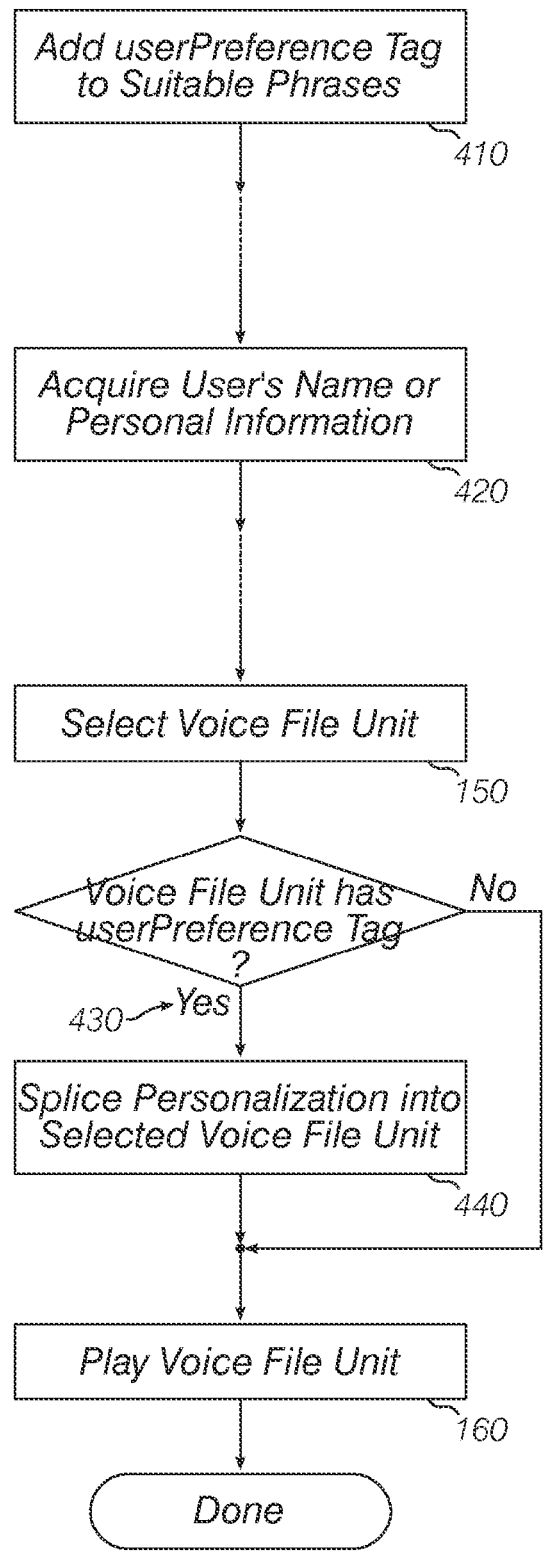
FIG. 4 is a flow chart for adding end-user customization to a synthesized conversation.

Some embodiments may include features to modify or customize a subject's recorded statements before they are played back for a user. FIG. 4 outlines a procedure for accomplishing this. First, during the annotation process, a special "userPreference" tag is attached to suitable phrases in the interview source database (410). This tag includes an insert time code to mark a particular place in the corresponding voice file unit. Later, during a synthesized conversation, the system acquires the user's name or other information about the user (420). For example, the system may play a voice file unit of the subject asking "Who's this?" and note the user's responsive answer. Later in the conversation, a voice file unit is selected as responsive to a user's statement (150). If the tags for this unit include the userPreference tag (430), then a recorded or synthesized personalization sample is spliced into the voice file unit at the insert time code (440). Finally, the voice file unit is played for the user (160). The personalization sample may be one recorded by the subject during the original conversation (i.e., the subject may record a list of

| Speaker | Statement | NLP Tags |
| --- | --- | --- |
| Interviewer | So, tell me about the Chicago tour. | |
| Musician 1 | It was brutal! The A/C went out at the venue and we were overbooked, so everybody was sweating like crazy. But it was a great show - the audience loved our cover of Wild Love. | Knowledge Vertical: CHICAGO show\|air conditioning\|A-C\| hot\|crowded\|Wild Love\| audience |
| Musician 2 | Yeah, after that show, we could'a slept for, like, a week! | sleep\|tired\|exhausted |
| Musician 2 | But I thought the version of Bang The Drum was better than Wild Love. Joe played that riff that was like [guitar-riff Foley sound]. | Bang The Drum\|Wild Love\| Joe |

In this example, note that the Interviewer's question can mark the beginning of a knowledge vertical about a show in Chicago. The Musicians' subsequent statements will most likely be played during a synthesized conversation only if the current topic is that show.

The NLP tags can be thought of as similar to regular expressions, which are used to match words and patterns appearing in text. In an embodiment, the text to be matched is the end user's statement (converted to text), and the result of common names and other likely-useful personalization words and phrases); or it may be synthesized by text-to-speech using a voice font created from portions of the original conversation.

The upshot of User Preference processing is that the subject's statements may be personalized to include the name or other information about the user. Thus, for example, if the subject addressed the interviewer during the original conversation: "Well, John, that's an interesting question;" then the statement can be modified during a later synthesized conversation to include the name of the system user: "Well, Mary, that's an interesting question."

An embodiment of the invention may be a machine-readable medium (including without limitation a non-transitory machine-readable medium) having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

One embodiment may be a data archive containing both an interview source database for a particular subject or subjects; and data and instructions to cause a programmable processor to conduct the synthesized conversation based on the interview source database. Such an embodiment could be provided on a machine-readable medium such as a CD-ROM or memory card, or could be transmitted to a user over a distributed data network such as the Internet. Another embodiment may be a service provided to a user over a network connection, where the user's computer serves principally as an audio interface device, accepting the user's statements through a microphone, digitizing them and sending them to a remote server for processing; and playing audio snippets returned from the server through a digital-to-analog converter and a speaker or other audio output device.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a machine-readable medium storing data and instructions to perform some of the operations discussed above. Compiling (if necessary) and executing such an embodiment at the receiver may result in the receiver performing operations according to a third embodiment.

In the preceding description, numerous details were set forth. It will be apparent, however, to one skilled in the art, that the present invention may be practiced without some of these specific details. In some instances, well-known structures and devices are shown in block diagram form, rather than in detail, in order to avoid obscuring the present invention.

Some portions of the detailed descriptions may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, including without limitation any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing computer instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will be recited in the claims below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that synthetic conversations between a user and a specific person or persons, can also be produced by software and hardware that distribute the functions of embodiments of this invention differently than herein described. Such variations and implementations are understood to be captured according to the following claims.

We claim:

1. A method comprising:

recording at least three audio streams from at least three original speakers during a conversation between the at least three original speakers, wherein each audio stream contains mainly sounds produced by a corresponding one of the at least three original speakers and one of the at least three original speakers serves as an interviewer of a remaining at least two original speakers;

separating the at least three audio streams into a plurality of voice file units, each of said voice file units containing an audio record of a phrase uttered by one of the at least three original speakers;

annotating the plurality of voice file units with Natural Language Processing ("NLP") tags to facilitate subsequent identification of the voice file units, said annotating operative to produce an interview source database containing at least the annotated plurality of voice file units;

receiving a statement from a system user;

matching the statement against the interview source database to catch a responsive one of the annotated voice file units; and playing the responsive one of the annotated voice file units to produce an audio output for the system user, said audio output comprising mainly sounds produced by one of the remaining at least two original speakers.

2. The method of claim 1, further comprising:

converting the statement from the system user to a textual representation before performing the matching operation.

3. The method of claim 1, further comprising:

accepting a telephone connection from the system user before the receiving operation; and repeating the receiving, matching and playing operations a plurality of times, wherein the receiving operation comprises obtaining an audio signal from the system user via the telephone connection and converting the audio signal to a textual representation, and the playing operation comprises transmitting the audio output to the system user via the telephone connection.

* * * * *